United States Patent [19]

Matsuda et al.

[11] Patent Number: 4,664,214
[45] Date of Patent: May 12, 1987

[54] MOTORCYCLE HAVING STEERED FRONT AND REAR WHEELS WITH CONTROL FOR RATIO

[75] Inventors: Atsushi Matsuda, Iwata; Toshiyuki Sato, Fukuroi, both of Japan

[73] Assignee: Yamaha Hatsudoki Kabushiki Kaisha, Iwata, Japan

[21] Appl. No.: 825,272

[22] Filed: Feb. 3, 1986

[30] Foreign Application Priority Data

Feb. 4, 1985 [JP] Japan ................................. 60-18602

[51] Int. Cl.$^4$ ............................................ B62K 21/00
[52] U.S. Cl. .................................... 180/219; 180/141
[58] Field of Search ............... 180/219, 220, 222, 223, 180/224, 227, 140, 141, 142, 143; 280/267, 269, 266, 91

[56] References Cited

U.S. PATENT DOCUMENTS

| | | | |
|---|---|---|---|
| 602,034 | 4/1898 | Murphy | 280/266 |
| 4,105,086 | 8/1978 | Ishii et al. | 280/91 |
| 4,157,739 | 6/1979 | Frye | 180/224 |
| 4,418,780 | 12/1983 | Ito et al. | 180/142 |

FOREIGN PATENT DOCUMENTS 1222610 2/1971 United Kingdom ................. 280/91

*Primary Examiner*—John A. Pekar
*Attorney, Agent, or Firm*—Ernest A. Beutler

[57] ABSTRACT

Steering arrangements for motorcycles herein the rear wheel is supported for steering movement and is mechanically coupled to the mechanism for steering the front wheel so that both wheels will be steered in unison. An arrangement is provided to adjust the steering ratio between the front and rear wheels in response either to vehicle load or an engine running condition.

12 Claims, 8 Drawing Figures

MOTORCYCLE HAVING STEERED FRONT AND REAR WHEELS WITH CONTROL FOR RATIO

BACKGROUND OF THE INVENTION

This invention relates to a motorcycle having steered front and rear wheels and more particularly to an improved steering system for the rear wheel and an improved control system for the rear wheel steering.

Recently, it has been realized that the handling of a motorcycle can be significantly improved if the rear wheel is supported so that it may be steered and is mechanically coupled to the front wheel so that the front and rear wheels will be steered together. The steering relationship between the front and rear wheels can be very critical to the handling. The speed of travel and load on the vehicle can necessitate changes in the steering ratio to suit certain of these conditions.

It is, therefore, a principal object of this invention to provide an improved steering arrangement for the front and rear wheels of a vehicle.

It is another object of this invention to provide a rear wheel steering mechanism that permits controlling the ratio of steering between the front and rear wheels.

It is a yet further object of ths invention to provide an improved and simplified arrangement for controlling the steering ratio between the front and rear wheels of a vehicle such as a motorcycle.

SUMMARY OF THE INVENTION

This invention is adapted to be embodied in a vehicle having at least one dirigible front wheel steered by an operator and at least one rear wheel. In accordance with this feature of the invention, means are provided for supporting the rear wheel for steering movement and means mechanically couple the front and rear wheels for simultaneous steering movement. Means are provided for adjusting the steering relationship between the front and rear wheels.

In accordance with a first feature of the invention, the steering relationship between the front and rear wheels is changed in response to the load on the vehicle.

In accordance with another feature of the invention, the steering relationship between the front and rear wheels is changed in response to the running condition of the engine.

DETAILED DESCRIPTION FO THE PREFERRED EMBODIMENTS

Figure 1:
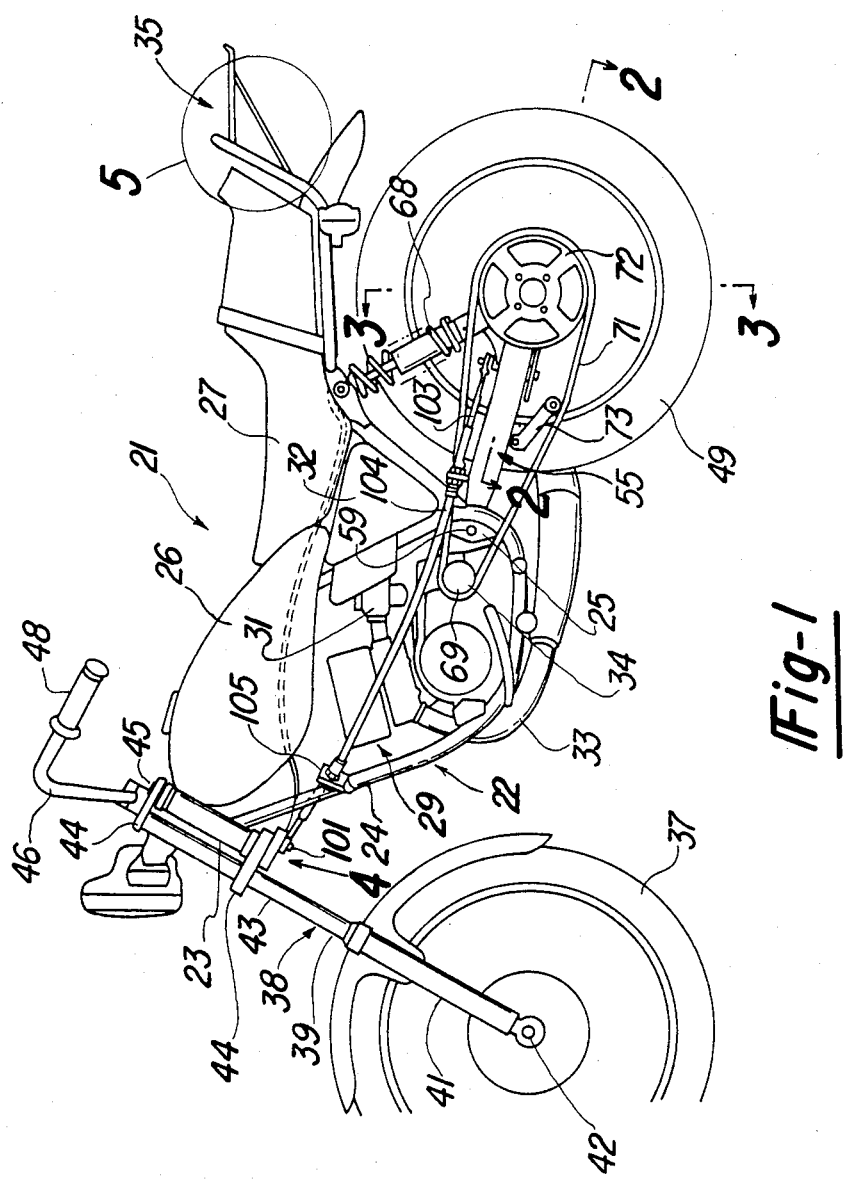
FIG. 1 is a side elevational view of a motorcycle constructed in accordance with an embodiment of the invention.

A motorcycle constructed in accordance with this embodiment is identified generally by the reference numeral 21. The motorcycle 21 includes a frame assembly, indicated generally by the reference numeral 22, and which may be of any known type. In the illustrated embodiment, the frame assembly 22 is depicted as being made up of a welded tubular construction including a head pipe 23, a main tube 30, a pair of down tubes 24 and brackets 25 that are affixed to the down tubes 24 and rearwardly and downwardly projection portions of the main tube 30. A fuel tank 26 is supported on the main tube and is positioned forwardly of a seat 27 that is supported on a seat rail 19 and a seat pillar rail 28 of the frame assembly 22. Since the frame assembly per se forms no part of the invention, a further description of it is believed to be unnecessary.

An internal combustion engine, indicated generally by the reference numeral 29 is supported within the frame assembly 22 in a known manner. In the illustrated embodiment, the engine 29 is depicted as being of the reciprocating type and has one or more cylinders that receive a fuel/air charge from a carburetor 31 that is positioned rearwardly of the cylinder block and which extends in a generally horizontal direction. An air cleaner and air silencer assembly 32, which is positioned within the frame 22 rearwardly of the carburetors 31 and beneath the seat 27, supplies air to the carburetor 31. In addition, the engine 29 is provided with an exhaust system 33 for silencing the exhaust gases and discharging them to the atmosphere. The engine 29 also includes a combined crankcase, transmission assembly that drives an output shaft 34 at any of a plurality of selected speed ratios.

Figure 5:
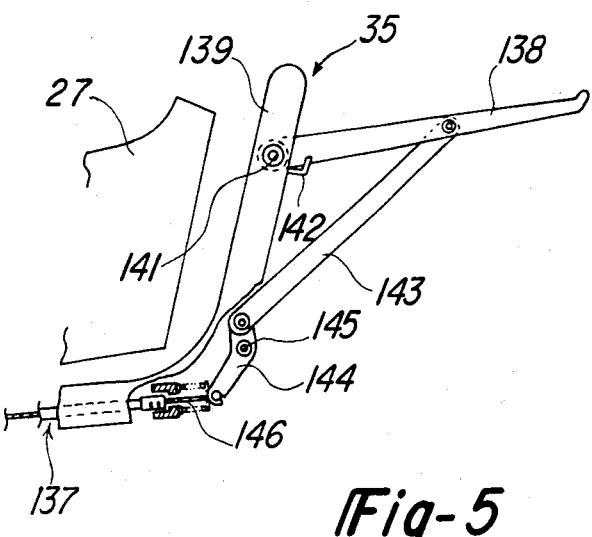
FIG. 5 is an enlarged side elevational view of the area encompassed by the circle 5 in FIG. 1 and shows the load responsive steering adjusting mechanism.

A luggage carrier, indicated generally by the reference numeral 35 is carried on the frame 22 rearwardly of the seat 27 for carrying a load. The luggage carrier 35 is best shown in FIG. 5 and will be later described in conjunction with its function to provide a load responsive signal to the steering mechanism.

A front wheel 37 supported from the forward portion of the frame assembly 22 and specifically the head pipe 23 for steering and suspension movement by means of a front wheel steering assembly, indicated generally by the reference numeral 38. The front wheel steering assembly 38 includes a front fork 39 having a tubular suspension system 41 that carries the front wheel 37 for rotation about an axis 42 at its lower end. The system 41 is supported for vertical movement relative to an upper portion 43 so as to accommodate controlled suspension movement for the front wheel 37.

Upper and lower brackets 44 connect the front fork upper portion 39 to a steering shaft 45 is journaled for rotation about a front steering axis in the head pipe 23. A handlebar assembly 46 is connected to the brackets 44 and steering shaft 45. The handlebar 46 carries hand grips 48 at its outer end. It should be readily apparent that a rider positioned on the seat 27 may steer the front wheel 37 through the hand grips 48 and handlebar 46.

The suspension movement of the front wheel 37 is about an axis that is inclined to the vertical and which is parallel to the steering axis so that the front wheel 37 contacts the ground line at a point.

A driven rear wheel assembly, indicated generally by the reference numeral 49, is carried at the rear end of the frame assembly 22 in a manner to be described. The rear wheel 49 includes a tire 51 that is mounted on a rim 52 that is connected to a hub portion 54.

It should be noted that the motorcycle 21 as thus far described is generally conventional in configuration, and for that reason, only the general construction has been described in detail.

Figure 2:
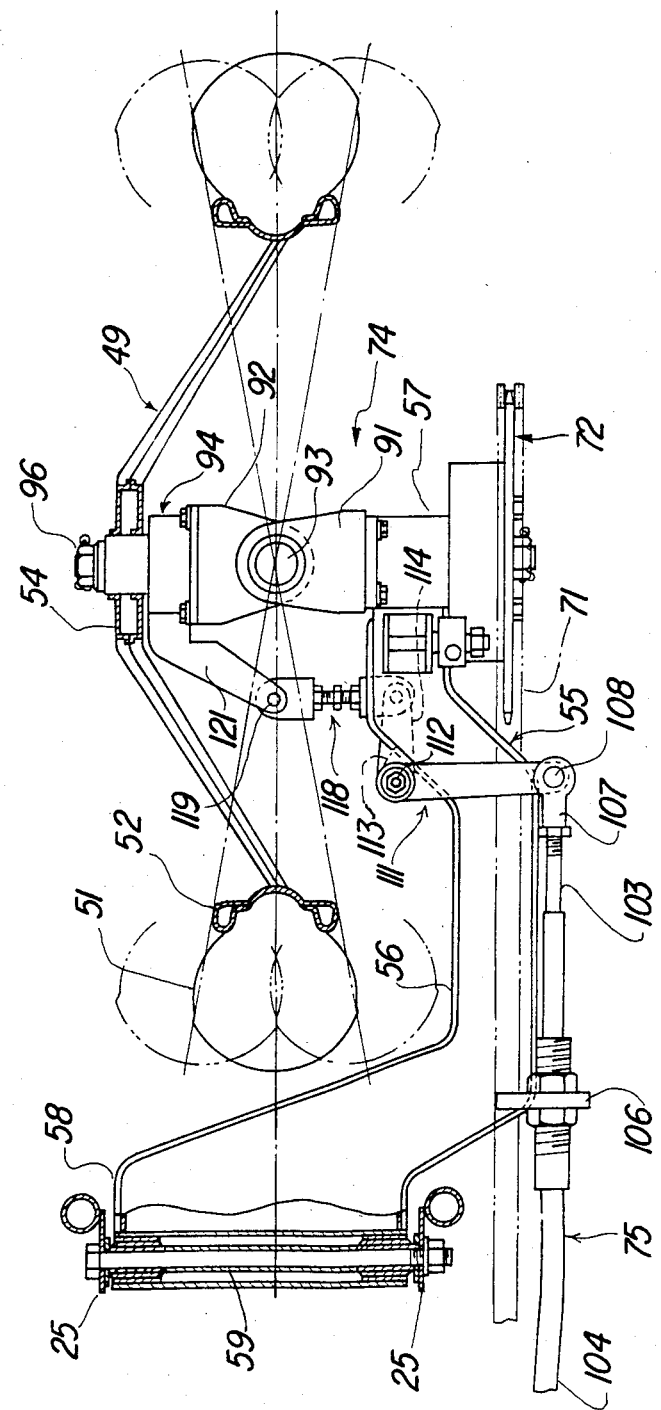
FIG. 2 is an enlarged cross-sectional view taken along the line 2—2 of FIG. 1 showing the rear wheel suspension and steering mechanism.
Figure 3:
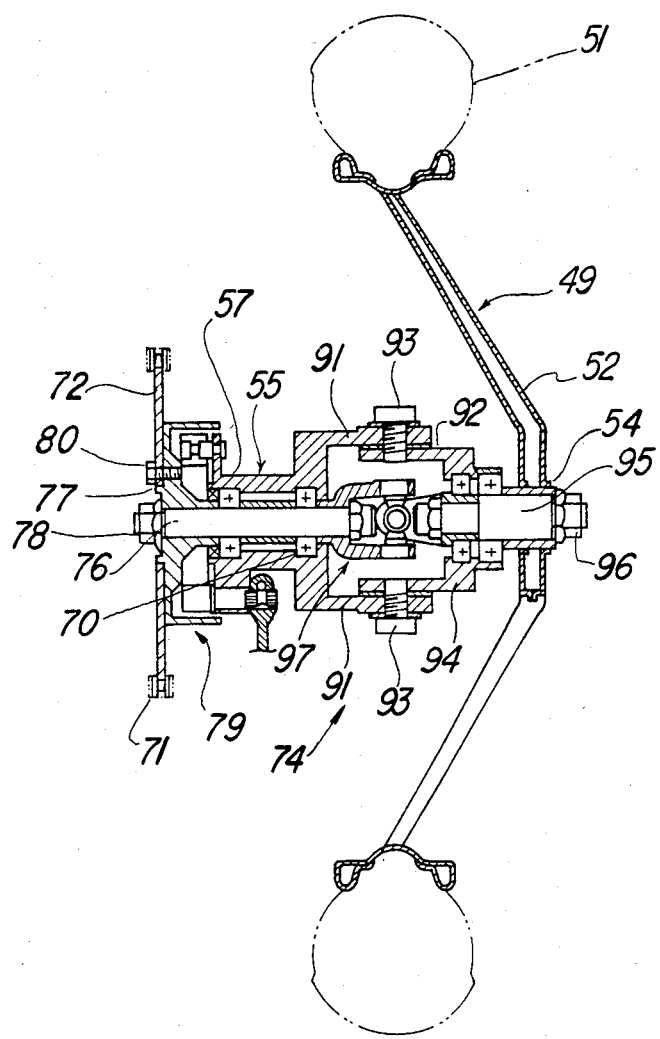
FIG. 3 is an enlarged cross-sectional view taken along the line 3—3 of FIG. 1.

The rear wheel 49 is supported for suspension movement relative to the frame 22 by means that include a trailing arm assembly, indicated generally by the reference numeral 55 and shown in more detail in FIGS. 2 and 3. Because of differences which will be described, the trailing arm assembly 55 includes one rearwardly extending arm portion 56 that lies on only one side of the rear wheel assembly 49 and which supports the rear wheel assembly by means of a hub carrier 57 that is fixed at its trailing end in a manner to be described. Forwardly of the rearwardly extending portion 56, the trailing arm 55 has a main portion 58 that extends substantially across the width of the motorcycle between the brackets 25. This portion is pivotally carried by the bracket 25 in a suitable manner for movement about an axis 59.

The suspension travel of the rear wheel 49 and trailing arm 55 are controlled by a combined coil spring and shock absorber unit 68 that is loaded between the rear end of the arm portion 56 and the frame 22 at a point contiguous to where the seat piller 28 joins the seat rail 19.

The rear wheel 49 is driven and, to this end, a driving sprocket 69 is affixed to the engine transmission output shaft 34. A driving chain 71 encircles the sprocket 69 and a driven sprocket 72 that is affixed for rotation with the rear wheel 49 in a manner which will be described. A chain tensioner 73 is carried by the trailing arm 55 so as to maintain uniform tension on the driving chain 71 during its suspension movement.

In addition to being driven and supported for suspension movement, the rear wheel assembly 49 is also supported for steering movement by means of a steering support, indicated generally by the reference numeral 74. The steering support 74 is designed so as to provide a steering axis that passes through the transverse center of the rear wheel assembly 49 and which lies on a plane passing through the center of the motorcycle 21 containing the front wheel steering axis. The rear wheel steering axis extends generally vertically.

The steering of the rear wheel 49 about the steering axis is controlled by means of a steering control mechanism, indicated generally by the reference numeral 75 which connects the front wheel steering mechanism with the rear wheel steering support mechanism 74 in a manner to be described.

Referring now primarily to FIGS. 2 and 3, the rear wheel steering support mechanism 74 will be described in detail. The hub carrier 57 has a pair of spaced apart bearings 70 that rotatably journal a shaft 76. The shaft has a splined connection to a hub member 77 which is, in turn, affixed to the sprocket 72 by means of bolt assemblies 80. The sprocket 72 and hub member 77 are axially affixed to the shaft 76 by means of a nut 78.

The hub member 77 forms a portion of a drum brake assembly, indicated by the reference numeral 79, which may be of any known type.

The hub carrier 57 has affixed to it a bifurcated member 91 which, in turn, is pivotally connected to a second bifurcated member 92 by means of a pair of vertically disposed pivot pins 93. The pivot axis between the bifurcated members 91 and 92 defined by the pivot pins 93 lies on the steering axis of the rear wheel assembly 49 and also within the center plane of the motorcycle 21.

The further bifurcated member 92 is affixed to a second hub carrier 94 which, in turn, journals a shaft 95 by means of a pair of spaced bearings. The shaft 95 is nonrotatably affixed to the rear wheel hub 54 by a splined connection and the hub 54 is held axially onto the shaft 95 by means of a retainer nut 96.

The shafts 76 and 95 are rotatably coupled by means of a universal joint 97 that has its pivotal axis lying within the plane on the steering axis of the rear wheel so that the steering movement of the rear wheel assembly 49 will not interfere with the driving forces transmitted to the rear wheel through the universal joint 97.

The steering control mechanism 75 is provided for mechanically coupling the front wheel steering mechanism to the mechanism for steering the rear wheel 74 so that both wheels will be steered in unison and for permitting controlled adjustment of the steering ratio between the front and rear wheels. This mechanism includes an adjustable connection, indicated generally as 101 (FIG. 4) between the lowermost fork bracket 44 and a trunnion member 102. The trunnion member 102 is connected to one end of a flexible transmitter 103 that is contained within a protective sheath 104. The adjacent forward end of the protective sheath 104 is carried by the down tube 24 and specifically by means of a bracket 105 that is connected to it.

The rear end of the protective sheath 104 is fixed adjustably to a bracket 106 carried by the trailing arm assembly 55. The rear end of the wire actuator 103 is connected by means of a trunnion 107 and pivot pin 108 to one arm 109 of a bellcrank assembly 111. The bellcrank assembly 111 is supported for pivotal movement about a vertically extending axis by means of a pivot pin 112 that is carried by a bracket 113 that is affixed to the trailing arm portion 56. Another arm 114 of the bellcrank 111 is connected by means of a pivot pin to a trunnion and a turnbuckle assembly 118 so as to permit adjustment. The turnbuckle assembly 118 is, in turn, connected by means of a pivot pin 119 to a steering arm 121 that is formed integrally with or affixed to the hub carrier 94.

The steering operation of this embodiment will now be described. If the rider steers the front wheel 37 by rotating the handlebars 46 and front wheel 37, there will be a force exerted on the flexible transmitter 103 to move it. This movement places a force on the bellcrank 111 and specifically its arm 109 so as to pivot it about the pivot pin 112. The arm 115 then exerts a force through the turnbuckle 118 so as to pivot the steering arm 112 and hub carrier 94 about the rear steering axis. Thus, both the front and rear wheels will be steered. The mechanical arrangement of the linkage system is such, however, that the angle of steering movement of the front wheel 37 and, as has been noted, this ratio may be changed by the adjustable connection 101 now to be described by reference to FIG. 4.

Figure 4:
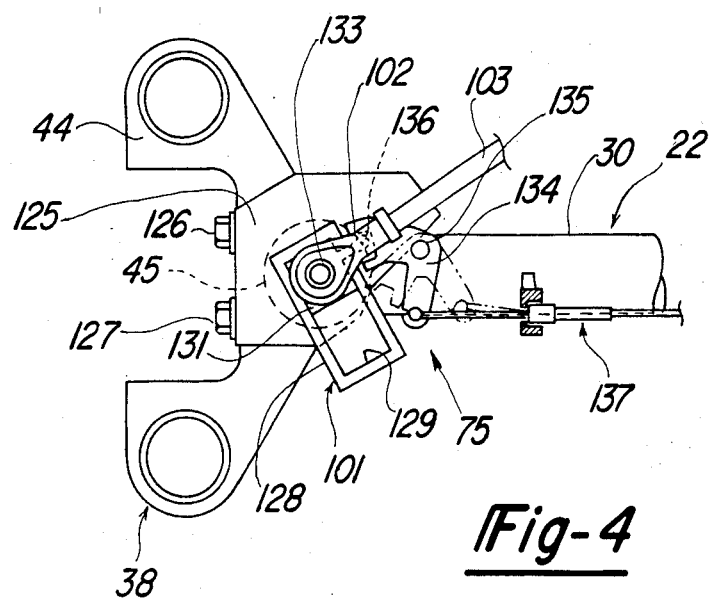
FIG. 4 is an enlarged view taken generally in the direction of the arrow 4 in FIG. 1 showing the mechanism for controlling the rear wheel steering.

The adjustable connection 101 includes a bracket member 125 that is affixed to the lower steering fork plate 44 by means of threaded fasteners 126 and 127. The bracket member 125 has a generally rectangular shaped projection 128 in which a recess 129 is formed and slidably supported within the recess 129 is a block piece 131. The block piece 131 carries a pivot pin 133 that provides the pivotal connection to the trunnion 102. It should be readily apparent that movement of the block piece 131 along the slot 129 will alter the degree of eccentricity and, accordingly, the steering ratio between the front and rear wheels. When the block piece is at the extreme inner position as shown in FIG. 4, there will be no steering of the wheel since the pivot pin 133 is aligned with the axis of the steering shaft 45 and rotation of the steering shaft will not effect any movement of the block 131 other than rotation about the common axis between the steering shaft 45 and the pivot pin 133.

The degree of eccentricity of the block 134 within the groove 129 is controlled by means of a bellcrank 134 that is pivotally supported on the bracket 125 by means of a pivot 135. One arm of the bellcrank 134 has a notched recess that receives a projection 136 of the block 131 that extends through an elongated slot in the side of the projection 128. It should be readily apparent that pivotal movement of the bellcrank 134 will effect reciprocation of the block 131 in the recess 129 and hence change the steering ratio.

The steering ratio is adjusted by means of a control mechanism, indicated generally by the reference numeral 137. The control mechanism 137 in this embodiment is responsive to the load carried by the motorcycle 21 and specifically the load on the carrier 35. The way in which this is done may be best understood by reference to FIG. 5.

The carrier 35 includes a load supporting member 138 that is pivotally supported on an upstanding arm 139 of the frame 22 by means of a pivot pin 141. A torsional spring 142 normally urges the load supporting member 138 to an upper position. An actuating link 143 is pivotally connected at one end to the load supporting member 138 and to one arm of a bellcrank 144 that is pivotally supported on the frame member 139 by means of a pivot pin 145. The other arm of the bellcrank 144 is connected to a flexible transmitter 145 which, in turn, is connected at its other end to the remaining arm of the control bellcrank 134 (FIG. 4).

The drawings show the embodiment in the no load condition and, in this condition, the bellcrank 134 is rotated to the position shown in solid lines in FIG. 4 and there will be no effective steering of the rear wheel. However, as the load on the load supporting member 138 increases, the actuating link 143 will act on the bellcrank 144 so as to pivot it in a counterclockwise direction and exert a tension on the flexible transmitter 146. This will cause the bellcrank 134 to pivot in a counterclockwise direction toward the phantom line view shown in FIG. 4 and increase the amount of steering to the rear wheel 49 for a given steering input of the front wheel 37.

In the embodiment of FIGS. 1 through 5, the steering ratio was changed by the load on the carrier 35. It should be readily apparent that a similar mechanism could be employed for sensing any other load on the motorcycle 21 for effecting a change in the steering ratio.

Figure 6:
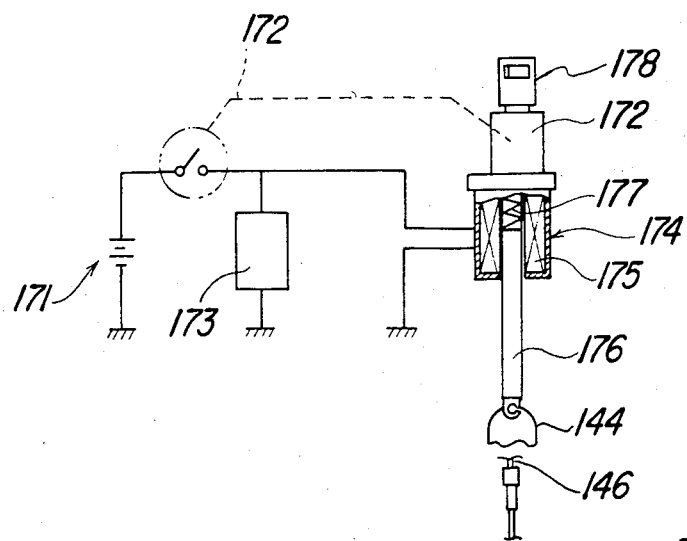
FIG. 6 is a schematic view showing another embodiment of the invention.
Figure 7:
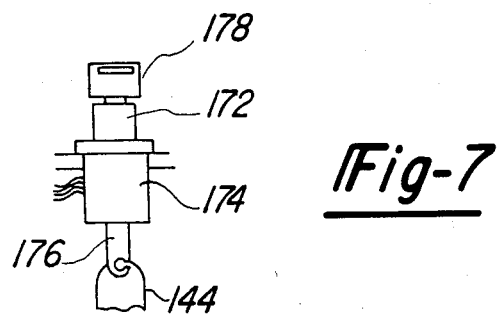
FIG. 7 is a view of the control element in one operative condition.
Figure 8:
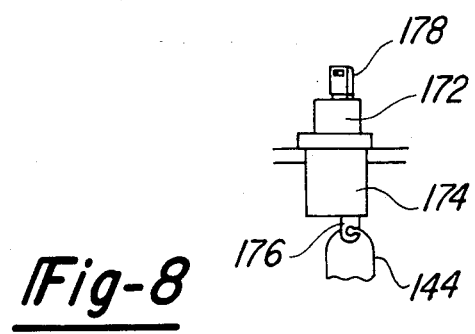
FIG. 8 is a view, in part similar to FIG. 7, showing the control element in another operative condition.

FIGS. 6 through 8 show an embodiment wherein the steering ratio is changed in response to the running condition of the engine. In the illustrated embodiment, there is no rear wheel steering when the engine is not running and when the engine is running, rear wheel steering is effected. Since only the manner in which the steering control is actuated differs from the previously described embodiment, only this portion of the construction has been illustrated. In the drawings, the connection to the bellcrank 144 has been indicated schematically and it should be understood that this connection may be made either to the bellcrank 144 or directly to the flexible transmitter 146. Alternatively, the connection may be made directly to the bellcrank 134.

FIG. 6 illustrates schematically how the device is wired into the ignition system for the engine 29. The battery is indicated by the reference numeral 171 and is in circuit with the ignition switch 172 and the engine ignition system, indicated schedmatically at 173. In parallel circuit with the ignition 173 is a solenoid 174 having a winding 175 and armature 176. In the illustrated embodiment, the ignition switch 172 and solenoid 174 may be conveniently confined into a single housing. The armature 176 is normally biased by means of a spring 177 to a downward position wherein the bellcrank 144 is rotated so that the mechanism will be in a no rear wheel steering mode. However, when the ignition switch 172 is closed by inserting a key 178, turning and depressing it, the solenoid winding 175 will be energized and the armature 176 will be pulled upwardly (FIG. 8) so as to pivot the bellcrank 144 in a direction to tension the wire transmitter 146 and effect rear wheel steering.

It should be readily apparent that a wide variety of other types of controls may be employed for effecting rear wheel steering in response to desired conditions.

The described embodiments of the invention are particularly adapted for changing the steering ratio between the front and rear wheels in response to such conditions as load or engine running. Various changes and modifications may be made without departing from the spirit and scope of the invention, as defined by the appended claims.

We claim:

1. A motorcycle having only one dirigible front wheel steered by an operator and one rear wheel and a load carrier, the improvement comprising means for supporting said rear wheel for steering movement, means for mechanically coupling said front and said rear wheels for simultaneous steering movement, and means for adjusting the steering relationship between said front and rear wheels in response to the load applied to said load carrier.

2. A motorcycle as set forth in claim 1 further including operator control means for steering the front wheel.

3. A motorcycle as set forth in claim 2 wherein the means for mechanically coupling the front and rear wheel couples the rear wheel steering mechanism to the front wheel steering mechanism and the means for adjusting the steering relationship comprises means for adjusting the ratio of the mechanical coupling in response to the load applied to the load carrier.

4. A motorcycle as set forth in claim 3 wherein the coupling means comprises a linkage system and the means for adjusting comprises means for adjusting the effective length of one of said links.

5. A motorcyle as set forth in claim 4 wherein the front and rear wheels are supported for suspension movement.

6. A motorcyle as set forth in claim 4 wherein at least one of the steered wheels is driven.

7. A motorcyle as set forth in claim 6 wherein the front and rear wheels are supported for suspension movement.

8. A vehicle having at least one dirigible front wheel steered by an operator and at least one rear wheel, and an engine for driving at least one of said wheels, the improvement comprising means for supporting said rear wheel for steering movement, means for mechanically coupling said front and said rear wheels for simultaneous steering movement, and means for adjusting the steering relationship between said front and rear wheels in response to whether the engine is running or not.

9. A vehicle as set forth in claim 8 further including opertor control means for steering the front wheel.

10. A vehicle as set forth in claim 9 wherein the means for mechanically coupling the front and rear wheel couples the rear wheel steering mechanism to the front wheel steering mechanism and the means for adjusting the steering relationship comprises means for adjusting the ratio of the mechanical coupling in response to whether the engine is running or not.

11. A vehicle as set forth in claim 10 wherein the coupling means comprises a linkage system and the means for adjusting comprises means for adjusting the effective length of one of said links.

12. A vehicle as set forth in claim 11 wherein the front and rear wheels are supported for suspension movement.

* * * * *